(12) United States Patent
Cao

(10) Patent No.: US 12,196,693 B2
(45) Date of Patent: Jan. 14, 2025

(54) IMAGING SYSTEMS AND METHODS OF OPERATING THE SAME

(71) Applicant: SHENZHEN XPECTVISION TECHNOLOGY CO., LTD., Shenzhen (CN)

(72) Inventor: Peiyan Cao, Shenzhen (CN)

(73) Assignee: SHENZHEN XPECTVISION TECHNOLOGY CO., LTD., Shenzhen (CN)

( * ) Notice: Subject to any disclaimer, the term of this patent is extended or adjusted under 35 U.S.C. 154(b) by 447 days.

(21) Appl. No.: 17/859,133

(22) Filed: Jul. 7, 2022

(65) Prior Publication Data

US 2022/0334072 A1 Oct. 20, 2022

Related U.S. Application Data

(63) Continuation of application No. PCT/CN2020/076777, filed on Feb. 26, 2020.

(51) Int. Cl.
 *G01N 23/2252* (2018.01)

(52) U.S. Cl.
CPC ..... *G01N 23/2252* (2013.01); *G01N 2223/079* (2013.01); *G01N 2223/20* (2013.01); *G01N 2223/40* (2013.01); *G01N 2223/501* (2013.01); *G01N 2223/507* (2013.01)

(58) Field of Classification Search
CPC ......... G01N 23/2252; G01N 2223/079; G01N 2223/20; G01N 2223/40; G01N 2223/501; G01N 2223/507
See application file for complete search history.

(56) References Cited

U.S. PATENT DOCUMENTS

| 2011/0206179 A1 | 8/2011 | Bendahan |
| 2019/0304125 A1 | 10/2019 | Kashu |

FOREIGN PATENT DOCUMENTS

| CN | 102365703 A | 2/2012 |
| CN | 102422364 A | 4/2012 |
| CN | 203233589 U | 10/2013 |
| CN | 107887243 A | 4/2018 |
| CN | 108139488 A | 6/2018 |
| CN | 109243947 A | 1/2019 |
| CN | 109996494 A | 7/2019 |
| EP | 1314976 A2 | 5/2003 |
| EP | 1982164 B1 | 8/2014 |
| EP | 3187112 B1 | 10/2019 |
| WO | 2020028422 A1 | 2/2020 |

*Primary Examiner* — Nicole M Ippolito
*Assistant Examiner* — Hanway Chang
(74) *Attorney, Agent, or Firm* — IPro, PLLC

(57) ABSTRACT

Disclosed herein is a method of operating an imaging system which comprises (A) an image sensor comprising (a) a top surface, (b) M physically separate active areas on the top surface, and (c) a dead zone on the top surface and between the M active areas, and (B) a radiation source system which comprises an electron bombardment target, the method comprising: for i=1, ..., N, sequentially causing emission of X-ray photons (i) from a radiation position (i) by causing electrons to bombard a target surface of the electron bombardment target at the radiation position (i); and for i=1, ..., N, in response to the emission of the X-ray photons (i), capturing M images (i) of portions (i) of a same object, respectively in the M active areas, resulting in M×N images, wherein each point of the object is captured in at least one image of the M×N images.

22 Claims, 13 Drawing Sheets

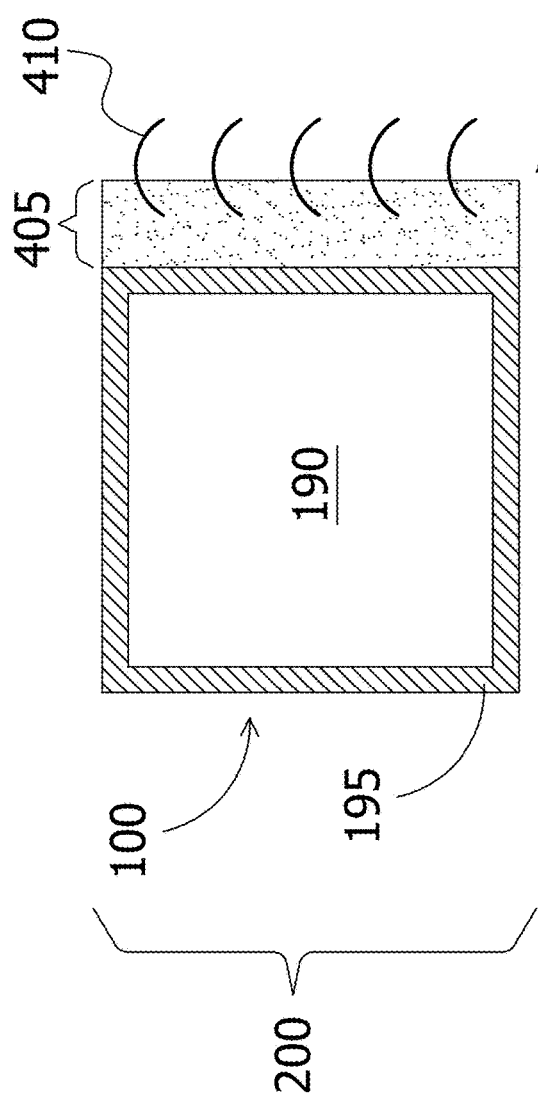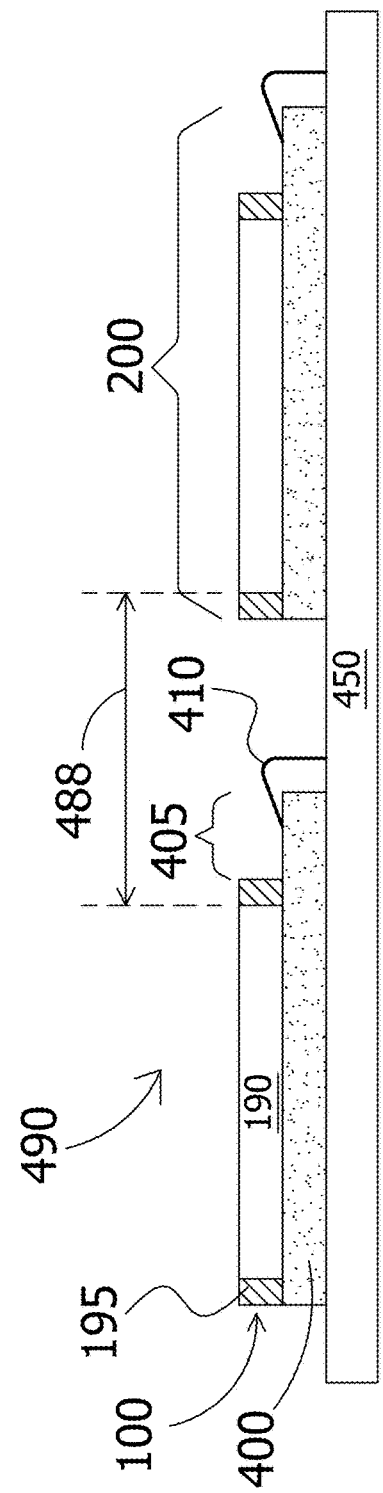

IMAGING SYSTEMS AND METHODS OF OPERATING THE SAME

TECHNICAL FIELD

The disclosure herein relates to imaging technology, and particularly relates to imaging systems and methods of operating the same.

BACKGROUND

A radiation detector is a device that measures a property of a radiation. Examples of the property may include a spatial distribution of the intensity, phase, and polarization of the radiation. The radiation may be one that has interacted with an object. For example, the radiation measured by the radiation detector may be a radiation that has penetrated the object. The radiation may be an electromagnetic radiation such as infrared light, visible light, ultraviolet light, X-ray or γ-ray. The radiation may be of other types such as α-rays and β-rays. An imaging system may include multiple radiation detectors. Radiation detectors are expensive; therefore, typical imaging systems of the prior art are also expensive.

SUMMARY

Disclosed herein is an imaging system, comprising: an image sensor which comprises (a) a top surface, (b) M active areas on the top surface, M being an integer greater than 0, and (c) a dead zone on the top surface and between the M active areas such that no one active area of the M active areas is in direct physical contact with another active area of the M active areas; and a radiation source system, which comprises an electron gun and an electron bombardment target, wherein, for i=1, . . . , N, N being an integer greater than 1, the radiation source system is configured to cause emission of X-ray photons (i) from a radiation position (i) by causing electrons from the electron gun to bombard a target surface of the electron bombardment target at the radiation position (i), wherein for i=1, . . . , N, in response to the emission of the X-ray photons (i) from the radiation position (i), the image sensor is configured to capture M images (i) of portions (i) of a same object, respectively in the M active areas, resulting in M×N images, and wherein each point of the object is captured in at least one image of the M×N images.

According to an embodiment, the electron bombardment target has a shape of a plate.

According to an embodiment, the electron bombardment target is configured to rotate while the radiation positions (i), i=1, . . . , N remain on target surfaces of the electron bombardment target.

According to an embodiment, the electron bombardment target is configured to tilt, translate, or both tilt and translate.

According to an embodiment, the radiation source system is configured to deflect an electron beam from the electron gun.

According to an embodiment, the electron bombardment target comprises N target blocks, and for i=1, . . . , N, the radiation position (i) is on a target surface of a target block (i) of the N target blocks.

According to an embodiment, the electron bombardment target comprises tungsten.

According to an embodiment, the electron gun is configured to generate an electron beam and then deflect the electron beam.

According to an embodiment, the imaging system further comprises a vacuum tube in which the radiation source system resides.

According to an embodiment, the imaging system further comprises a direct current (DC) voltage source configured to cause a voltage drop from the electron bombardment target to the electron gun.

According to an embodiment, M is 1 and N is 2.

According to an embodiment, the radiation positions (i), i=1, . . . , N are on a plane parallel to the top surface.

Disclosed herein is a method of operating an imaging system which comprises (A) an image sensor comprising (a) a top surface, (b) M active areas on the top surface, M being an integer greater than 0, and (c) a dead zone on the top surface and between the M active areas such that no one active area of the M active areas is in direct physical contact with another active area of the M active areas, and (B) a radiation source system which comprises an electron bombardment target, the method comprising: for i=1, . . . , N, N being an integer greater than 1, sequentially causing emission of X-ray photons (i) from a radiation position (i) by causing electrons to bombard a target surface of the electron bombardment target at the radiation position (i); and for i=1, . . . , N, in response to the emission of the X-ray photons (i) from the radiation position (i), capturing M images (i) of portions (i) of a same object, respectively in the M active areas, resulting in M×N images, wherein each point of the object is captured in at least one image of the M×N images.

According to an embodiment, said causing emission of the X-ray photons (i) from the radiation position (i) comprises holding the electron bombardment target stationary with respect to the image sensor such that the radiation positions (i), i=1, . . . , N are on the target surfaces of the electron bombardment target.

According to an embodiment, the electron bombardment target has a shape of a plate.

According to an embodiment, the electron bombardment target comprises N target blocks, and for i=1, . . . , N, the radiation position (i) is on a target surface of a target block (i) of the N target blocks.

According to an embodiment, said causing emission of the X-ray photons (i) from the radiation position (i) comprises rotating the electron bombardment target.

According to an embodiment, the electron bombardment target has a shape of a plate.

According to an embodiment, said causing emission of the X-ray photons (i) from the radiation position (i) comprises tilting, translating, or both tilting and translating the electron bombardment target.

According to an embodiment, the radiation source system further comprises an electron gun configured to generate an electron beam, and said causing emission of the X-ray photons (i) from the radiation position (i) comprises deflecting the electron beam.

According to an embodiment, the electron gun and P radiation positions of the radiation positions (i), i=1, . . . , N are on a straight line, and P is an integer greater than 1 and not greater than N.

According to an embodiment, the method further comprises stitching the M×N images to form an image of the object.

BRIEF DESCRIPTION OF FIGURES

FIG. 3 schematically shows a top view of a package including the radiation detector and a printed circuit board (PCB).

FIG. 4 schematically shows a cross-sectional view of an image sensor, where a plurality of the packages of FIG. 3 are mounted to a system PCB, according to an embodiment.

DETAILED DESCRIPTION

Figure 1:
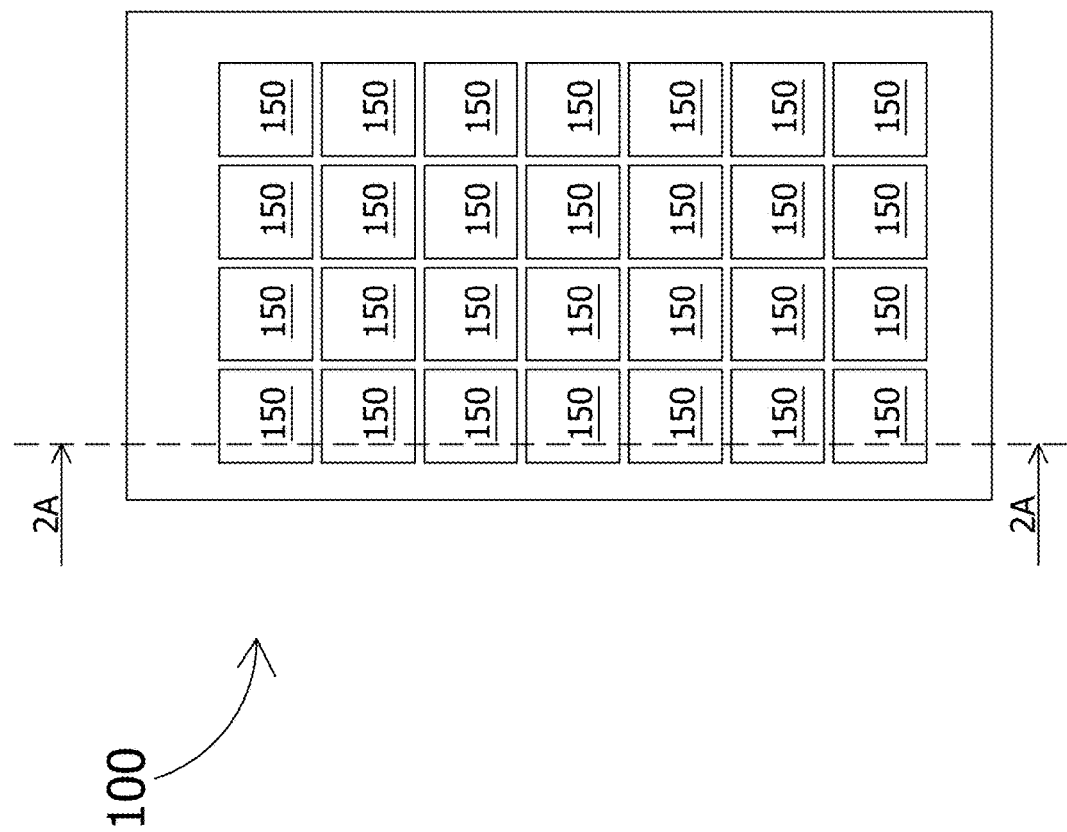
FIG. 1 schematically shows a radiation detector, according to an embodiment.

FIG. 1 schematically shows a radiation detector 100, as an example. The radiation detector 100 includes an array of pixels 150. The array may be a rectangular array (as shown in FIG. 1), a honeycomb array, a hexagonal array or any other suitable array. The array of pixels 150 in the example of FIG. 1 has 7 rows and 4 columns; however, in general, the array of pixels 150 may have any number of rows and any number of columns.

Each pixel 150 is configured to detect radiation from a radiation source (not shown) incident thereon and may be configured to measure a characteristic (e.g., the energy of the particles, the wavelength, and the frequency) of the radiation. A radiation may include particles such as photons (electromagnetic waves) and subatomic particles. Each pixel 150 may be configured to count numbers of particles of radiation incident thereon whose energy falls in a plurality of bins of energy, within a period of time. All the pixels 150 may be configured to count the numbers of particles of radiation incident thereon within a plurality of bins of energy within the same period of time. When the incident particles of radiation have similar energy, the pixels 150 may be simply configured to count numbers of particles of radiation incident thereon within a period of time, without measuring the energy of the individual particles of radiation.

Each pixel 150 may have its own analog-to-digital converter (ADC) configured to digitize an analog signal representing the energy of an incident particle of radiation into a digital signal, or to digitize an analog signal representing the total energy of a plurality of incident particles of radiation into a digital signal. The pixels 150 may be configured to operate in parallel. For example, when one pixel 150 measures an incident particle of radiation, another pixel 150 may be waiting for a particle of radiation to arrive. The pixels 150 may not have to be individually addressable.

The radiation detector 100 described here may have applications such as in an X-ray telescope, X-ray mammography, industrial X-ray defect detection, X-ray microscopy or microradiography, X-ray casting inspection, X-ray non-destructive testing, X-ray weld inspection, X-ray digital subtraction angiography, etc. It may be suitable to use this radiation detector 100 in place of a photographic plate, a photographic film, a PSP plate, an X-ray image intensifier, a scintillator, or another semiconductor X-ray detector.

Figure 2A:
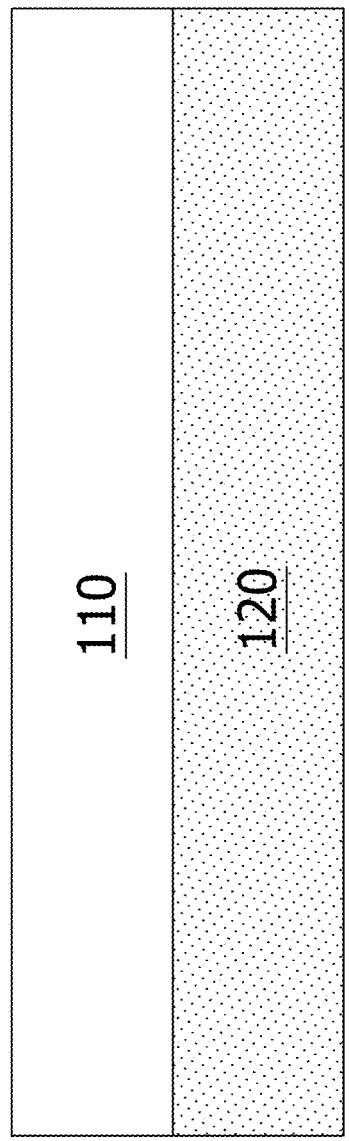
FIG. 2A schematically shows a simplified cross-sectional view of the radiation detector.

FIG. 2A schematically shows a simplified cross-sectional view of the radiation detector 100 of FIG. 1 along a line 2A-2A, according to an embodiment. More specifically, the radiation detector 100 may include a radiation absorption layer 110 and an electronics layer 120 (e.g., an ASIC) for processing or analyzing electrical signals which incident radiation generates in the radiation absorption layer 110. The radiation detector 100 may or may not include a scintillator (not shown). The radiation absorption layer 110 may include a semiconductor material such as, silicon, germanium, GaAs, CdTe, CdZnTe, or a combination thereof. The semiconductor material may have a high mass attenuation coefficient for the radiation of interest.

Figure 2B:
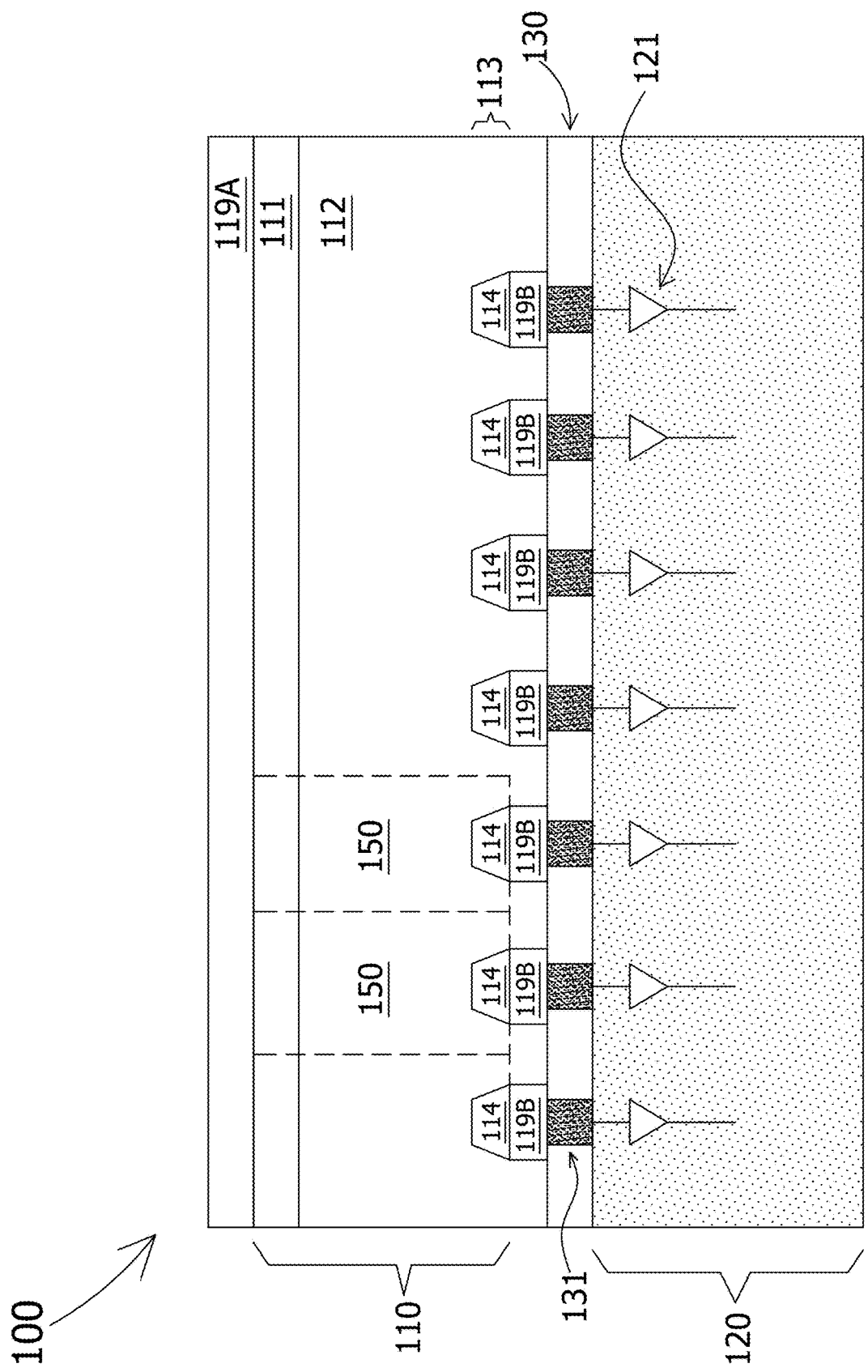
FIG. 2B schematically shows a detailed cross-sectional view of the radiation detector.

FIG. 2B schematically shows a detailed cross-sectional view of the radiation detector 100 of FIG. 1 along the line 2A-2A, as an example. More specifically, the radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional intrinsic region 112. The discrete regions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example of FIG. 2B, each of the discrete regions 114 of the second doped region 113 forms a diode with the first doped region 111 and the optional intrinsic region 112. Namely, in the example in FIG. 2B, the radiation absorption layer 110 has a plurality of diodes (more specifically, 7 diodes corresponding to 7 pixels 150 of one row in the array of FIG. 1, of which only 2 pixels 150 are labeled in FIG. 2B for simplicity). The plurality of diodes have an electrode 119A as a shared (common) electrode. The first doped region 111 may also have discrete portions.

The electronics layer 120 may include an electronic system 121 suitable for processing or interpreting signals generated by the radiation incident on the radiation absorption layer 110. The electronic system 121 may include an analog circuitry such as a filter network, amplifiers, integrators, and comparators, or a digital circuitry such as a microprocessor, and memory. The electronic system 121 may include one or more ADCs. The electronic system 121 may include components shared by the pixels 150 or components dedicated to a single pixel 150. For example, the electronic system 121 may include an amplifier dedicated to each pixel 150 and a microprocessor shared among all the pixels 150. The electronic system 121 may be electrically connected to the pixels 150 by vias 131. Space among the vias may be filled with a filler material 130, which may increase the mechanical stability of the connection of the electronics layer 120 to the radiation absorption layer 110. Other bonding techniques are possible to connect the electronic system 121 to the pixels 150 without using the vias 131.

When radiation from the radiation source (not shown) hits the radiation absorption layer 110 including diodes, particles of the radiation may be absorbed and generate one or more charge carriers (e.g., electrons, holes) by a number of mechanisms. The charge carriers may drift to the electrodes of one of the diodes under an electric field. The field may be an external electric field. The electrical contact 119B may include discrete portions each of which is in electrical contact with the discrete regions 114. The term "electrical contact" may be used interchangeably with the word "electrode." In an embodiment, the charge carriers may drift in directions such that the charge carriers generated by a single particle of the radiation are not substantially shared by two different discrete regions 114 ("not substantially shared" here means less than 2%, less than 0.5%, less than 0.1%, or less than 0.01% of these charge carriers flow to a different one of the discrete regions 114 than the rest of the charge carriers). Charge carriers generated by a particle of the radiation incident around the footprint of one of these discrete regions 114 are not substantially shared with another of these discrete regions 114. A pixel 150 associated with a discrete region 114 may be an area around the discrete region 114 in which substantially all (more than 98%, more than 99.5%, more than 99.9%, or more than 99.99% of) charge carriers generated by a particle of the radiation incident therein flow to the discrete region 114. Namely, less than 2%, less than 1%, less than 0.1%, or less than 0.01% of these charge carriers flow beyond the pixel 150.

Figure 2C:
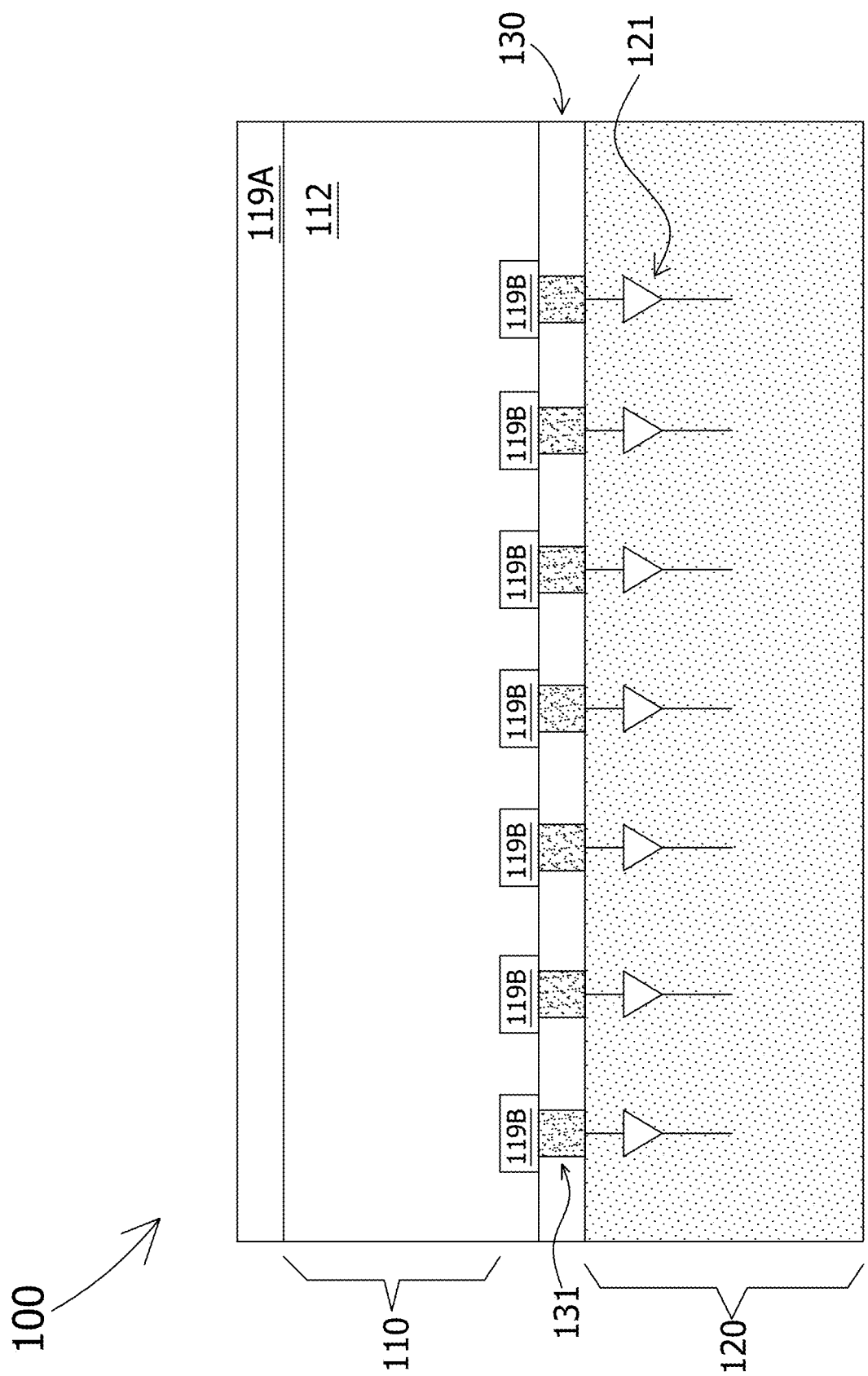
FIG. 2C schematically shows an alternative detailed cross-sectional view of the radiation detector.

FIG. 2C schematically shows an alternative detailed cross-sectional view of the radiation detector 100 of FIG. 1 along the line 2A-2A, according to an embodiment. More specifically, the radiation absorption layer 110 may include a resistor of a semiconductor material such as, silicon, germanium, GaAs, CdTe, CdZnTe, or a combination thereof, but does not include a diode. The semiconductor material may have a high mass attenuation coefficient for the radiation of interest. In an embodiment, the electronics layer 120 of FIG. 2C is similar to the electronics layer 120 of FIG. 2B in terms of structure and function.

When the radiation hits the radiation absorption layer 110 including the resistor but not diodes, it may be absorbed and generate one or more charge carriers by a number of mechanisms. A particle of the radiation may generate 10 to 100,000 charge carriers. The charge carriers may drift to the electrical contacts 119A and 119B under an electric field. The electric field may be an external electric field. The electrical contact 119B includes discrete portions. In an embodiment, the charge carriers may drift in directions such that the charge carriers generated by a single particle of the radiation are not substantially shared by two different discrete portions of the electrical contact 119B ("not substantially shared" here means less than 2%, less than 0.5%, less than 0.1%, or less than 0.01% of these charge carriers flow to a different one of the discrete portions than the rest of the charge carriers). Charge carriers generated by a particle of the radiation incident around the footprint of one of these discrete portions of the electrical contact 119B are not substantially shared with another of these discrete portions of the electrical contact 119B. A pixel 150 associated with a discrete portion of the electrical contact 119B may be an area around the discrete portion in which substantially all (more than 98%, more than 99.5%, more than 99.9% or more than 99.99% of) charge carriers generated by a particle of the radiation incident therein flow to the discrete portion of the electrical contact 119B. Namely, less than 2%, less than 0.5%, less than 0.1%, or less than 0.01% of these charge carriers flow beyond the pixel associated with the one discrete portion of the electrical contact 119B.

FIG. 3 schematically shows a top view of a package 200 including the radiation detector 100 and a printed circuit board (PCB) 400. The term "PCB" as used herein is not limited to a particular material. For example, a PCB may include a semiconductor. The radiation detector 100 is mounted to the PCB 400. The wiring between the radiation detector 100 and the PCB 400 is not shown for the sake of clarity. The PCB 400 may have one or more radiation detectors 100. The PCB 400 may have an area 405 not covered by the radiation detector 100 (e.g., for accommodating bonding wires 410). The radiation detector 100 may have an active area 190, which is where the pixels 150 (FIG. 1) are located. The radiation detector 100 may have a perimeter zone 195 near the edges of the radiation detector 100. The perimeter zone 195 has no pixels and the radiation detector 100 does not detect particles of radiation incident on the perimeter zone 195.

FIG. 4 schematically shows a cross-sectional view of an image sensor 490, according to an embodiment. The image sensor 490 may include a plurality of the packages 200 of FIG. 3 mounted to a system PCB 450. FIG. 4 shows only 2 packages 200 as an example. The electrical connection between the PCBs 400 and the system PCB 450 may be made by bonding wires 410. In order to accommodate the bonding wires 410 on the PCB 400, the PCB 400 has the area 405 not covered by the radiation detector 100. In order to accommodate the bonding wires 410 on the system PCB 450, the packages 200 have gaps in between. The gaps may be approximately 1 mm or more. Particles of radiation incident on the perimeter zones 195, on the area 405 or on the gaps cannot be detected by the packages 200 on the system PCB 450. A dead zone of a radiation detector (e.g., the radiation detector 100) is the area of the radiation-receiving surface of the radiation detector, in which incident particles of radiation cannot be detected by the radiation detector. A dead zone of a package (e.g., package 200) is the area of the radiation-receiving surface of the package, in which incident particles of radiation cannot be detected by the detector or detectors in the package. In this example shown in FIG. 3 and FIG. 4, the dead zone of the package 200 includes the perimeter zones 195 and the area 405. A dead zone (e.g., 488) of an image sensor (e.g., image sensor 490) with a group of packages (e.g., packages mounted on the same PCB, packages arranged in the same layer) includes the combination of the dead zones of the packages in the group and the gaps among the packages.

The image sensor 490 including the radiation detectors 100 may have the dead zone 488 incapable of detecting incident radiation. However, the image sensor 490 may capture images of all points of an object (not shown), and then these captured images may be stitched to form a full image of the entire object.

Figure 5:
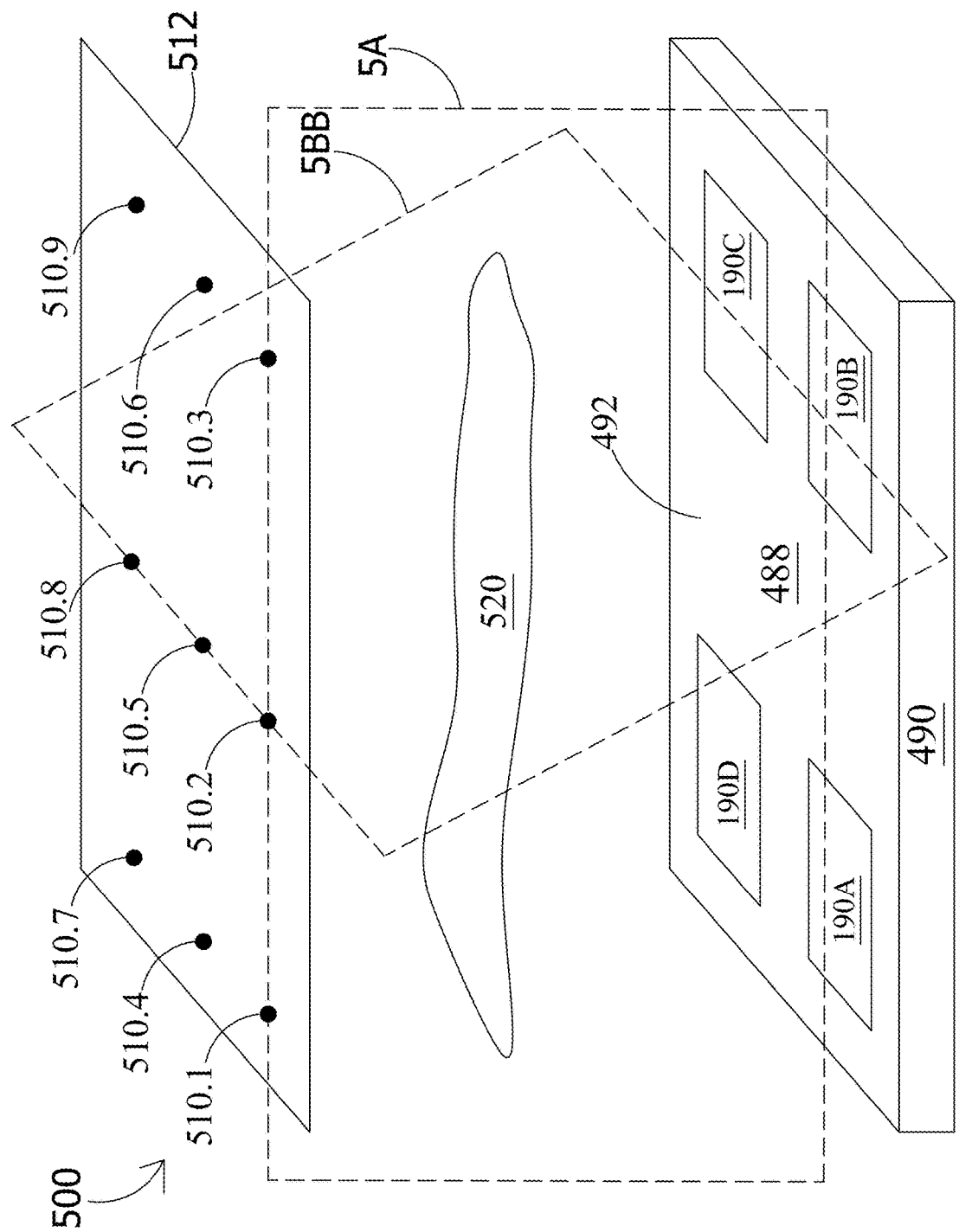
FIG. 5 schematically shows a perspective view of an imaging system including an image sensor and multiple radiation sources, according to an embodiment.

FIG. 5 schematically shows a perspective view of an imaging system 500 including the image sensor 490 of FIG. 4 and a radiation source system of multiple radiation sources 510, according to an embodiment. More specifically, as an example, the image sensor 490 may include 4 radiation detectors 100 represented for simplicity by their 4 active areas 190A, 190B, 190C, and 190D (or just 190A-D for simplicity) which may be arranged in a 2×2 rectangular array. Between the 4 active areas 190A-D is the dead zone 488 which is incapable of detecting incident radiation. In this example, the radiation source system of the imaging system 500 may include a 3×3 rectangular array of 9 radiation sources 510.1-9 which may be arranged in a plane 512 parallel to a top surface 492 of the image sensor 490.

The operation of the imaging system 500 may be described briefly as follows, according to an embodiment. Firstly, an object 520 may be placed between the image sensor 490 and the radiation sources 510.1-9. Then secondly, an exposure process may be performed in which the 9 radiation sources 510.1-9 are sequentially (i.e., one by one) turned on then off resulting in 36 images in the 4 active areas 190A-D (each of the 9 radiation sources 510.1-9 turning on then off creates 4 images in the 4 active areas 190A-D, hence 36 resulting images in total). In an embodiment, the arrangement of the active areas 190A-D, the radiation sources 510.1-9, and the object 520 is such that each point of the object 520 is captured in at least one image of the 36 resulting images. In other words, each point of the object 520 is captured in the 36 resulting images. In yet other words, no point of the object 520 is not captured in the 36 resulting images. Then thirdly, the 36 resulting images captured by the imaging system 500 may be stitched to form a full image of the entire object 520.

More specifically, the exposure process may begin with a first radiation exposure during which only the radiation source 510.1 of the 9 radiation sources 510.1-9 is on and sending out radiation (i.e., the other 8 radiation sources are off). While the radiation source 510.1 is on, the 4 active areas 190A-D capture incident radiation resulting in 4 images in these 4 active areas.

The radiation incident on the 4 active areas 190A-D while the radiation source 510.1 is on may include 3 types of incident particles of radiation: (a) particles of radiation that came directly from the radiation source 510.1 (i.e., their paths do not intersect the object 520), (b) particles of radiation that came from the radiation source 510.1 and penetrated the object 520 without changing direction, and (c) particles of radiation that also came from the object 520 like type (b) but are not of type (b). Examples of type (c) incident particles of radiation include scattered particles of radiation and reflected particles of radiation.

In an embodiment, the radiation from the radiation source 510.1 is such that incident particles of radiation of type (c) are negligible in comparison to incident particles of radiation of types (a) and (b). As an example of this embodiment, the object 520 may be an animal, and the radiation from the radiation source 510.1 may be X-ray. In this example where the object 520 is an animal, the radiation from the radiation source 510.1, in an embodiment, may not be visible lights because that would make incident particles of radiation of type (c) (i.e., reflected photons to be specific) significant whereas incident particles of radiation of type (b) (i.e., photons that penetrated the object 520) are negligible.

After the first radiation exposure is complete, the exposure process may continue with (i) reading out the 4 resulting images from the 4 active areas 190A-D for later processing, and then (ii) resetting the 4 active areas 190A-D.

Next, the exposure process may continue with a second radiation exposure during which only the radiation source 510.2 of the 9 radiation sources 510.1-9 is on and sending out radiation. While the radiation source 510.2 is on, the 4 active areas 190A-D capture incident radiation resulting in 4 images in these 4 active areas. In other words, the operation of the imaging system 500 during the second radiation exposure is similar to during the first radiation exposure. After the second radiation exposure is complete, the exposure process may continue with (i) reading out the 4 resulting images from the active areas 190A-D for later processing, and then (ii) resetting the active areas 190A-D.

After that, the exposure process may continue with a third, fourth, fifth, six, seventh, eighth, and then finally ninth radiation exposures sequentially (i.e., in series). After each of these radiation exposures, the 4 corresponding resulting images are read out for later processing and then the 4 active areas 190A-D are reset before the next radiation exposure is performed. The operations of the imaging system 500 during the third, fourth, fifth, six, seventh, eighth, and ninth radiation exposures are similar to during the first radiation exposure.

In short, during exposure process, a total of 9 radiation exposures are performed, and the 4 active areas 190A-D capture a total of 36 images. These 36 images captured by the imaging system 500 may be stitched to form a full image of the entire object 520.

Figure 6A:
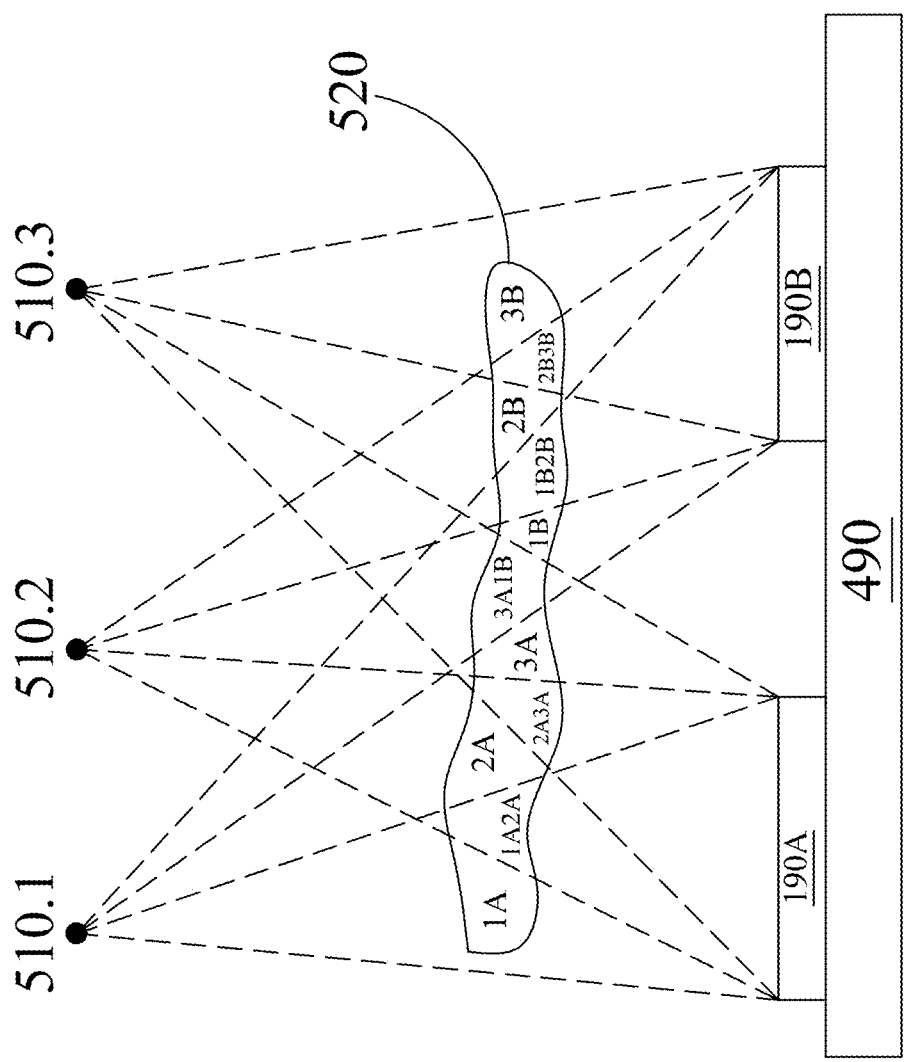
FIG. 6A shows a cross sectional view of the imaging system of FIG. 5 along a plane 5A.

FIG. 6A shows a cross sectional view of the imaging system 500 of FIG. 5 along a plane 5A which intersects the object 520, the radiation sources 510.1, 510.2, 510.3 and the active areas 190A, 190B. During the first radiation exposure while only the radiation source 510.1 is on, all points of the portion 1A+1A2A of the object 520 are captured in an image in the active area 190A, whereas all points of the portion 3A1B+1B+1B2B of the object 520 are captured in an image in the active area 190B.

Later, during the second radiation exposure while only the radiation source 510.2 is on, all points of the portion 1A2A+2A+2A3A of the object 520 are captured in an image in the active area 190A, whereas all points of the portion 1B2B+2B+2B3B of the object 520 are captured in an image in the active area 190B. Later, during the third radiation exposure while only the radiation source 510.3 is on, all points of the portion 2A3A+3A+3A1B of the object 520 are captured in an image in the active area 190A, whereas all points of the portion 2B3B+3B of the object 520 are captured in an image in the active area 190B.

In short, as a result of the first, second, and third radiation exposures, each point of the portions 1A, 1A2A, 2A, 2A3A, 3A, 3A1B, 1B, 1B2B, 2B, 2B3B, and 3B is captured in at least one image. In other words, each point of the object 520 in the plane 5A is captured in the images created in the imaging system 500 as a result of these 3 radiation exposures.

Figure 6B:
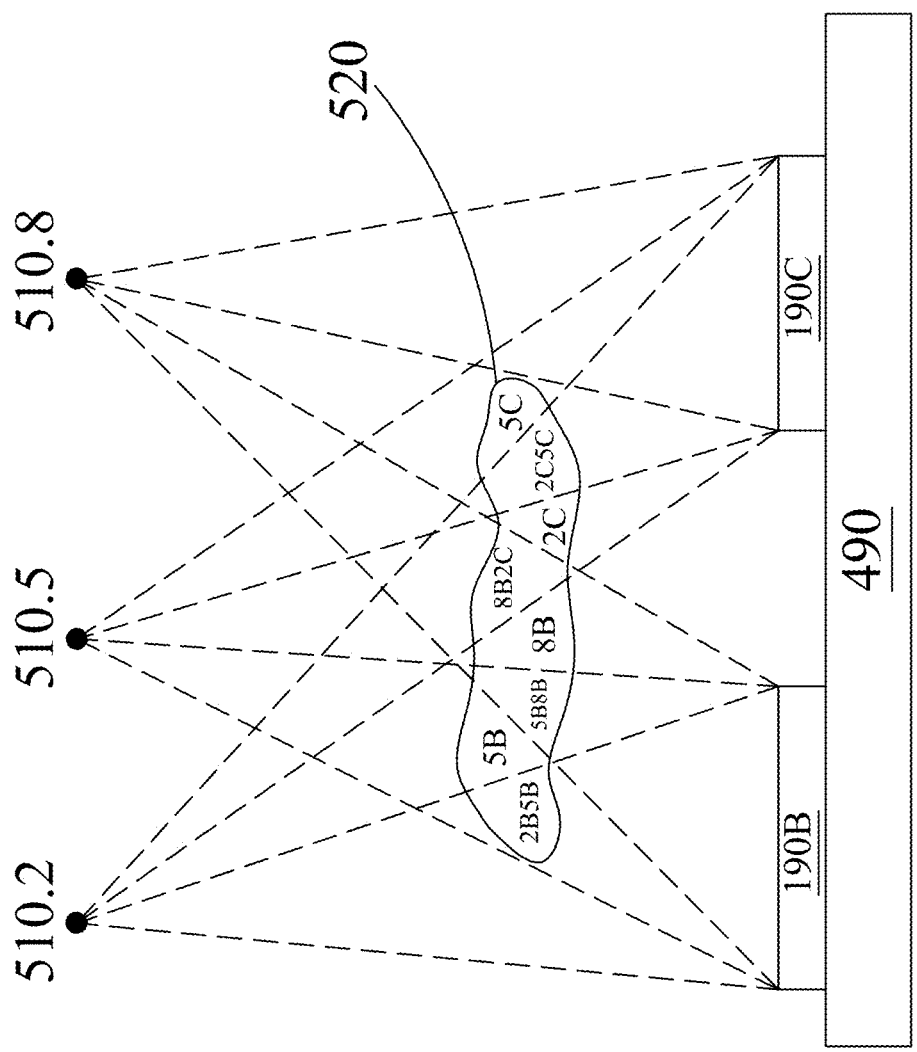
FIG. 6B shows a cross sectional view of the imaging system of FIG. 5 along a plane 5BB.

FIG. 6B shows a cross sectional view of the imaging system 500 of FIG. 5 along a plane 5BB which intersects the object 520, the radiation sources 510.2, 510.5, 510.8 and the active areas 190B, 190C. Similar to the description above with reference to FIG. 6A, as a result of the second, fifth, and eighth radiation exposures, each point of the portions 2B5B, 5B, 5B8B, 8B, 8B2C, 2C, 2C5C, and 5C is captured in at least one image. In other words, each point of the object 520 in the plane 5BB is captured in the images created in the imaging system 500 as a result of these 3 radiation exposures.

So, in general, as a result of the exposure process, each point of the object 520 is captured in at least one image in the imaging system 500. In other words, each point of the object 520 is captured in the resulting images created in the imaging system 500 as a result of the exposure process. Therefore, all the images resulting from the exposure process may be stitched to form a full image of the entire object 520.

Figure 7:
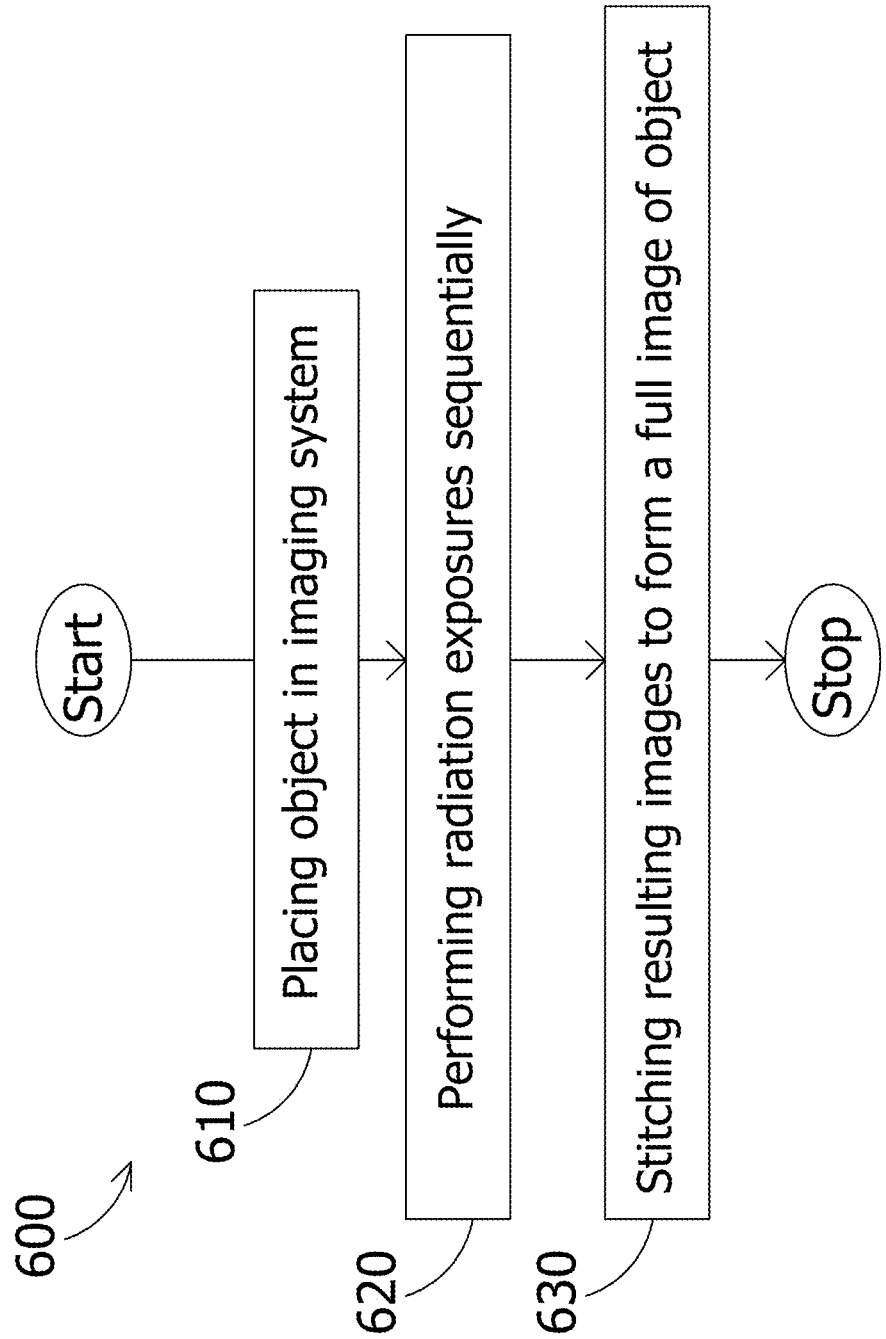
FIG. 7 shows a flowchart listing the steps for operating the imaging system of FIG. 5.

FIG. 7 shows a flowchart 600 listing the steps for operating the imaging system 500 of FIG. 5. More specifically, in step 610, the object 520 is placed in the imaging system 500. Next, in step 620, the exposure process is performed during which the 9 radiation exposures are performed sequentially resulting in 36 images. More specifically, each of the 9 radiation exposures includes turning on then off the corresponding radiation source 510 and capturing 4 images in the 4 active areas 190 while the corresponding radiation source 510 is on. Finally, in step 630, the 36 resulting images may be stitched to form a full image of the entire object 520.

In summary, with reference to FIG. 5, as a result of the exposure process, each point of the object 520 is captured in the 36 resulting images as described above. In other words, no point of the object 520 is not captured in the 36 resulting images. After the exposure process, the 36 resulting images created by the imaging system 500 may be stitched to form a full image of the entire object 520.

It should be noted with reference to FIG. 5 that, in a typical imaging system of the prior art, only one radiation source (510.5 for instance) is used (instead of 9 as described above) and therefore only one radiation exposure is performed (instead of 9 as described above) resulting in only 4 images (instead of 36 images as described above). As a result, in order for the typical imaging system of the prior art to capture all points of the object 520 by just one radiation exposure, additional active areas (similar to the active area 190A) must be added to completely replace the dead zone 488 between the active areas 190A-D. In other words, the present disclosure uses fewer active areas (hence saving costs) than in the prior art but can still achieve the same goal of capturing each and every point of the object 520 in the resulting captured images.

In the embodiments described above, with reference to FIG. 5, the 9 radiation sources 510.1-9 are sequentially turned on then off in the order of 510.1, 510.2, 510.3, 510.4, 510.5, 510.6, 510.7, 510.8, and then 510.9. In general, the 9 radiation sources 510.1-9 may be sequentially turned on then off in any order. For example, the 9 radiation sources 510.1-9 may be sequentially turned on then off in the order of 510.9, 510.8, 510.7, 510.6, 510.5, 510.4, 510.3, 510.2, and then 510.1.

In the embodiments described above, with reference to FIG. 5, the imaging system 500 include 4 active areas 190A-D arranged in a 2×2 rectangular array and 9 radiation sources 510.1-9 arranged in a 3×3 rectangular array. In general, the imaging system 500 may include M active areas (M being an integer greater than 0) and N radiation sources (N being an integer greater than 1), and these M active areas and N radiation sources may be arranged in any way as long as each point of the object 520 is captured in the resulting images created as a result of the exposure process.

As an example, with reference to FIG. 5 and FIG. 6A, the imaging system 500 may include only one active area 190A and only two radiation sources 520.1 and 520.2 (i.e., M=1 and N=2). As a result, the exposure process would include 2 consecutive radiation exposures thereby creating only 2 resulting images. In this example, the object 520 is too big to have each and every point of it captured by the imaging system 500. For instance, portion 3B of the object 520 (FIG. 6A) would not be captured in the 2 resulting images. However, a smaller object (such as portion 1A+1A2A+2A of the object 520 in FIG. 6A) would have each and every point of it captured by the imaging system 500. More specifically, as seen in FIG. 6A, each point of the smaller object 1A+1A2A+2A is captured in the 2 resulting images.

In the embodiments described above, with reference to FIG. 5, the imaging system 500 includes 9 radiation sources 510.1-9 which are sequentially turned on then off during the exposure process. In an alternative embodiment, the imaging system 500 may include only a single radiation source which (a) is similar to the radiation sources 510.1-9 described above and (b) moves through the 9 radiation positions of the 9 radiation sources 510.1-9 (hereafter referred to as radiation positions 510.1-9 for simplicity) in series during the exposure process so as to play the roles of the 9 radiation sources 510.1-9.

More specifically, during the first radiation exposure, the single radiation source may be in the radiation position 510.1 in FIG. 5 and plays the role of the radiation source 510.1. Later, during the second radiation exposure, the single radiation source may be in the radiation position 510.2 in FIG. 5 and plays the role of the radiation source 510.2, and so on until the exposure process is complete. After that, the resulting 36 images may be stitched to form a full image of the entire object 520.

As can be inferred from the descriptions above, in general, the method of the present disclosure will work as long as (a) during the first radiation exposure, there is radiation only from the radiation position 510.1 toward the 4 active areas 190A-D, and (b) during the second radiation exposure, there is radiation only from the radiation position 510.2 toward the 4 active areas 190A-D, and so on for the third, fourth, fifth, sixth, seventh, eighth, and ninth radiation exposures. The 9 radiations from the 9 radiation positions 510.1-9 (*a*) may come from 9 different radiation sources 510.1-9 as described in some embodiments above, or (b) may come from only one single radiation source moving through the 9 radiation positions 510.1-9 as described in some other embodiments above, or (c) may come from any number of radiation sources which may be used to play the roles of the 9 radiation sources 510.1-9 during the exposure process.

Figure 8A:
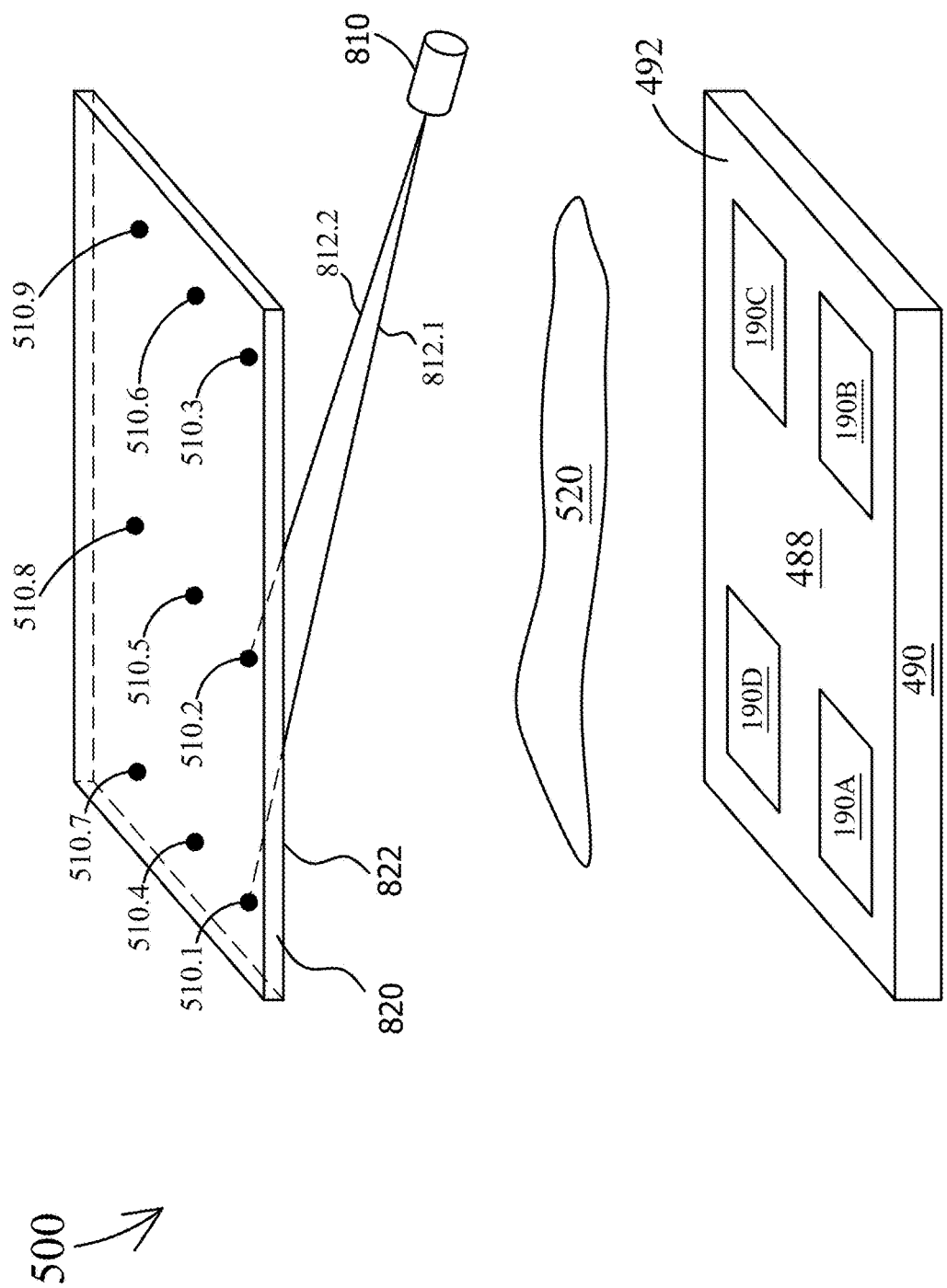
FIGS. 8A, 8B, 9A, and 9B schematically show embodiments of the radiation source system of FIG. 5.

FIG. 8A schematically shows an embodiment of the radiation source system of FIG. 5. Specifically, the radiation source system of FIG. 8A may include an electron gun 810 and an electron bombardment target 820.

In an embodiment, the electron gun 810 may be configured to shoot electrons to the 9 radiation positions 510.1-9 in sequence. In an embodiment, the electron gun 810 may be a typical electron gun of a typical CRT (cathode ray tube) television set. As a result, the electron gun 810 may be configured to generate an electron beam and then deflect or steer the generated electron beam to the 9 radiation positions 510.1-9 in sequence.

In an embodiment, the electron bombardment target 820 may be a plate comprising a material of high atomic weight such as tungsten (W). In an embodiment, the 9 radiation positions 510.1-9 may be on a target surface 822 (i.e., the bottom surface) of the plate 820. In an embodiment, the electron gun 810 and the plate 820 may be arranged such that the target surface 822 of the plate 820 faces the image sensor 490 and the electron gun 810.

It should be noted that when a bombarding electron from the electron gun 810 hits the target surface 822 of the plate 820 at a bombardment position, there may be 3 possibilities. The first possibility is that the bombarding electron interacts with the nucleus of an atom of the plate 820 at the bombardment position and loses energy via the emission of an X-ray photon from the bombardment position. This process is usually referred to as the Bremsstrahlung process.

The second possibility is that the bombarding electron knocks an orbital electron out of an inner shell of an atom of the plate 820 at the bombardment position. In response, another electron from an outer shell of the atom fills the resulting vacancy in the inner shell and thereby releases energy via the emission of an X-ray photon from the bombardment position. This process is usually referred to as the X-ray fluorescence process (or the characteristic X-ray emission process). The third possibility is that the bombarding electron causes the plate 820 at the bombardment position to heat up without causing any X-ray emission.

In an embodiment, the electron gun 810 may be configured to generate electrons with high energy so that when these generated electrons bombard the target surface 822 of the plate 820 at a bombardment position, these bombarding electrons have enough energy to cause the emission of X-ray photons from the bombardment position according to either the first or second possibility mentioned above or both.

It should be noted that an X-ray photon emitted according to either the first or second possibility as described above may propagate in any direction from the bombardment position. On one hand, if the emitted X-ray photon propagates deeper into the plate 820 (i.e., upward in FIG. 8A), then the emitted X-ray photon is likely absorbed by the plate 820. On the other hand, if the emitted X-ray photon propagates in an opposite direction (i.e., downward and away from the plate 820), then the emitted X-ray photon likely escapes the plate 820 and propagates toward the image sensor 490.

In short, when the electron gun 810 shoots electrons of sufficiently high energy to a bombardment position on the target surface 822 of the plate 820, these bombarding electrons cause the emission of X-ray photons from the bombardment position toward the object 520 and the image sensor 490.

In an embodiment, the operation of the radiation source system 810+820 of FIG. 8A during the exposure process may be as follows. During the first radiation exposure of the exposure process, the electron gun 810 may be configured to shoot electrons to the first radiation position 510.1 along a path 812.1. The bombardment of electrons on the target surface 822 of the plate 820 at the first radiation position 510.1 causes the emission of X-ray photons from the first radiation position 510.1 toward the object 520 and the image sensor 490. As a result, during the first radiation exposure, the electron gun 810 and the electron bombardment target 820 play the role of the first radiation source 510.1 as described in the embodiments above with reference to FIG. 5.

Similarly, during the second radiation exposure of the exposure process, the electron gun 810 may be configured to shoot electrons to the second radiation position 510.2 along a path 812.2. The bombardment of electrons on the target surface 822 of the plate 820 at the second radiation position 510.2 causes the emission of X-ray photons from the second radiation position 510.2 toward the object 520 and the image sensor 490. As a result, during the second radiation exposure, the electron gun 810 and the plate 820 play the role of the second radiation source 510.2 as described in the embodiments above with reference to FIG. 5.

Similarly, during the third, fourth, fifth, sixth, seventh, eighth, and ninth radiation exposures of the exposure process, the electron gun 810 may be configured to shoot electrons to the radiation positions 510.3-9 respectively in sequence. As a result, during the third, fourth, fifth, sixth, seventh, eighth, and ninth radiation exposures of the exposure process, the electron gun 810 and the plate 820 play the role of the third, fourth, fifth, sixth, seventh, eighth, and ninth radiation sources 510.3-9 respectively as described in the embodiments above with reference to FIG. 5.

In summary, as a result of the exposure process performed using the radiation source system 810+820 as described above, a total of 9 radiation exposures are performed, and the 4 active areas 190A-D capture a total of 36 images which contain each and every point of the object 520. These 36 images captured by the imaging system 500 may be stitched to form a full image of the entire object 520.

In some embodiments described above with reference to FIG. 8A, the electron bombardment target 820 has the shape of a plate. In general, the electron bombardment target 820 may have any shape and size provided that the 9 radiation positions 510.1-9 are on target surfaces of the electron bombardment target 820 so as to receive electron bombardments.

Figure 8B:
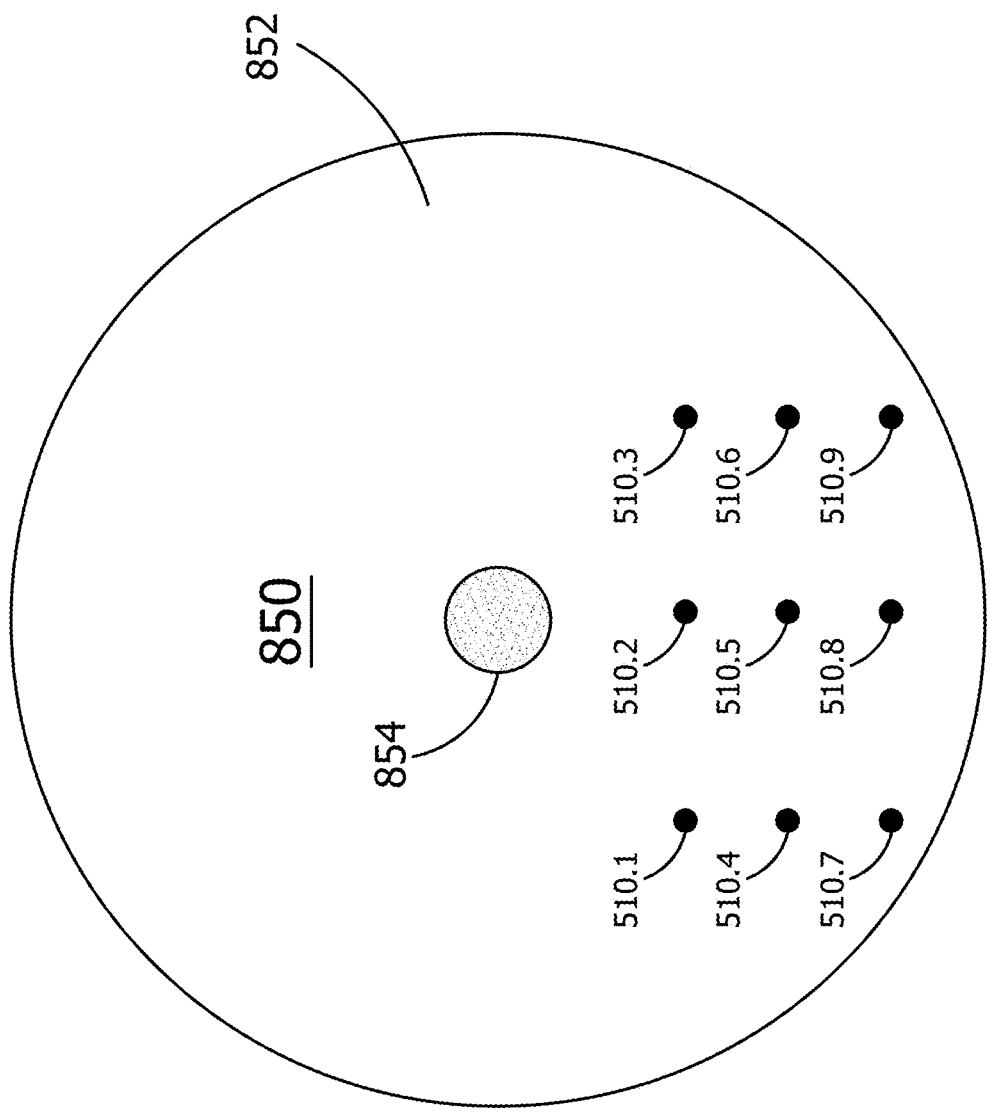

FIG. 8B schematically shows an electron bombardment target 850 as an alternative embodiment of the electron bombardment target 820 of FIG. 8A. Specifically, the electron bombardment target 850 of FIG. 8B may be a disk as viewed from the image sensor 490 (FIG. 8A), with the 9 radiation positions 510.1-9 being on a target surface 852 of the disk 850 facing the image sensor 490 (FIG. 8A). In an embodiment, the disk 850 may comprise a material of high atomic number such as tungsten (W).

In an embodiment, during the 9 radiation exposures of the exposure process, the disk 850 may rotate around an axis pole 854 (which is perpendicular to the page) such that the 9 radiation positions 510.1-9, which may be stationary with respect to the image sensor 490 (FIG. 8A), remain on the target surface 852 of the disk 850 during the rotation. In an embodiment, the axis pole 854 may comprise a metal such as copper (Cu). In an embodiment, the axis pole 854 may be perpendicular to the top surface 492 (FIG. 8A) of the image sensor 490. In an alternative embodiment, the axis pole 854 may make an angle of less than 90° with the top surface 492 (FIG. 8A) of the image sensor 490. In this alternative embodiment, the disk 850 should look like an oval (instead of a circle) when viewed from the image sensor 490 (FIG. 8A).

As a result of the 9 radiation positions 510.1-9 remaining on the target surface 852 of the disk 850 during the rotation, the operation of the radiation source system 810+850 as described above with reference to FIG. 8A is not affected. In addition, the heat generated in the disk 850 at the 9 radiation positions 510.1-9 due to the bombardment of electrons on the target surface 852 of the disk 850 at the 9 radiation positions 510.1-9 may be quickly spread out in the disk 850 due to the rotation and then dissipated away through the axis pole 854.

Figure 9A:
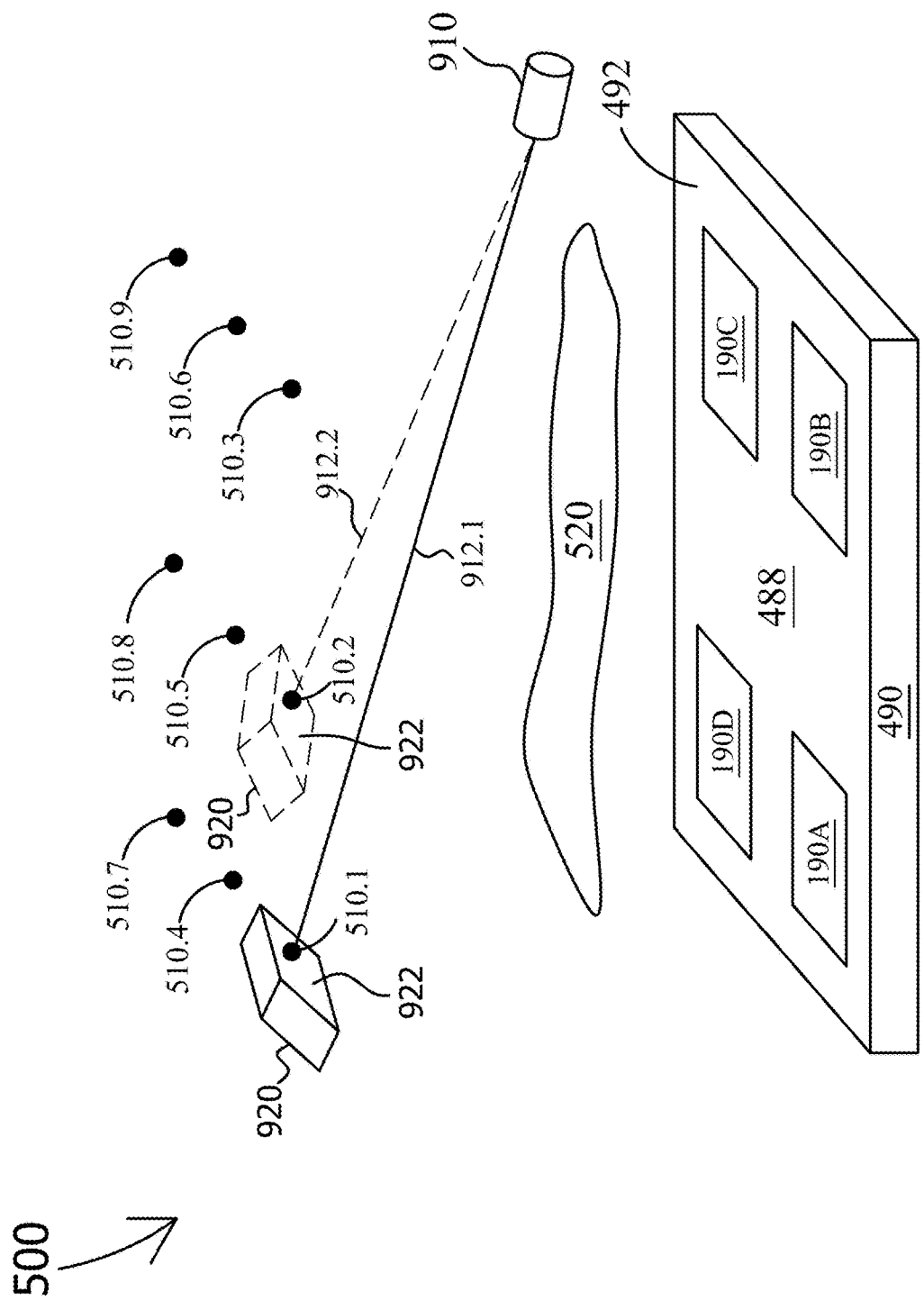

FIG. 9A schematically shows another embodiment of the radiation source system of FIG. 5. Specifically, the radiation source system of FIG. 9A may include an electron gun 910 and an electron bombardment target 920. In an embodiment, the electron gun 910 may be similar to the electron gun 810 of FIG. 8A. As a result, the electron gun 910 may be configured to shoot electrons to the 9 radiation positions 510.1-9 in sequence. In an embodiment, the electron bombardment target 920 may be a target block comprising a material of high atomic weight such as tungsten (W).

In an embodiment, a first method of operating the radiation source system 910+920 of FIG. 9A during the exposure process may be as follows. During the first radiation exposure of the exposure process, the electron gun 910 may be configured to shoot electrons to the first radiation position 510.1 along a path 912.1 while the target block 920 may be arranged such that the first radiation position 510.1 is on a target surface 922 of the target block 920 facing the image sensor 490 and the electron gun 910.

The bombardment of electrons on the target surface 922 of the target block 920 at the first radiation position 510.1 causes the emission of X-ray photons from the first radiation position 510.1 toward the object 520 and the image sensor 490. As a result, during the first radiation exposure, the electron gun 910 and the target block 920 play the role of the first radiation source 510.1 as described in the embodiments above with reference to FIG. 5.

Similarly, during the second radiation exposure of the exposure process, the electron gun 910 may be configured to shoot electrons to the second radiation position 510.2 along a path 912.2 while the target block 920 may be arranged such that the second radiation position 510.2 is on the target surface 922 of the target block 920 facing the image sensor 490 and the electron gun 910. This means that, in an embodiment, after the first radiation exposure ends but before the second radiation exposure starts, the target block 920 may be moved from the first radiation position 510.1 to the second radiation position 510.2. In an embodiment, the target block 920 may be configured to move from one radiation position 510 to another radiation position 510 (e.g., from the radiation position 510.1 to the radiation position 510.2) by translating (i.e., all points of the target block 920 move in the same direction by the same distance), tilting (i.e., rotating for less than a full circle), or both translating and tilting.

The bombardment of electrons on the target surface 922 of the target block 920 at the second radiation position 510.2 causes the emission of X-ray photons from the second radiation position 510.2 toward the object 520 and the image sensor 490. As a result, during the second radiation exposure, the electron gun 910 and the target block 920 play the role of the second radiation source 510.2 as described in the embodiments above with reference to FIG. 5.

Similarly, during the third, fourth, fifth, sixth, seventh, eighth, and ninth radiation exposures of the exposure process, the electron gun 910 and the target block 920 play the role of the third, fourth, fifth, sixth, seventh, eighth, and ninth radiation sources 510.3-9, respectively, as described in the embodiments above with reference to FIG. 5.

In summary, during the exposure process performed using the radiation source system 910+920 as described above, the electron beam generated by the electron gun 910 is steered to the 9 radiation positions 510.1-9 in sequence as the target block 920 moves through the 9 radiation positions 510.1-9 respectively in sequence so as to receive the electron beam. As a result of the exposure process, a total of 9 radiation exposures are performed, and the 4 active areas 190A-D capture a total of 36 images which contain each and every point of the object 520. These 36 images captured by the imaging system 500 may be stitched to form a full image of the entire object 520.

Figure 9B:
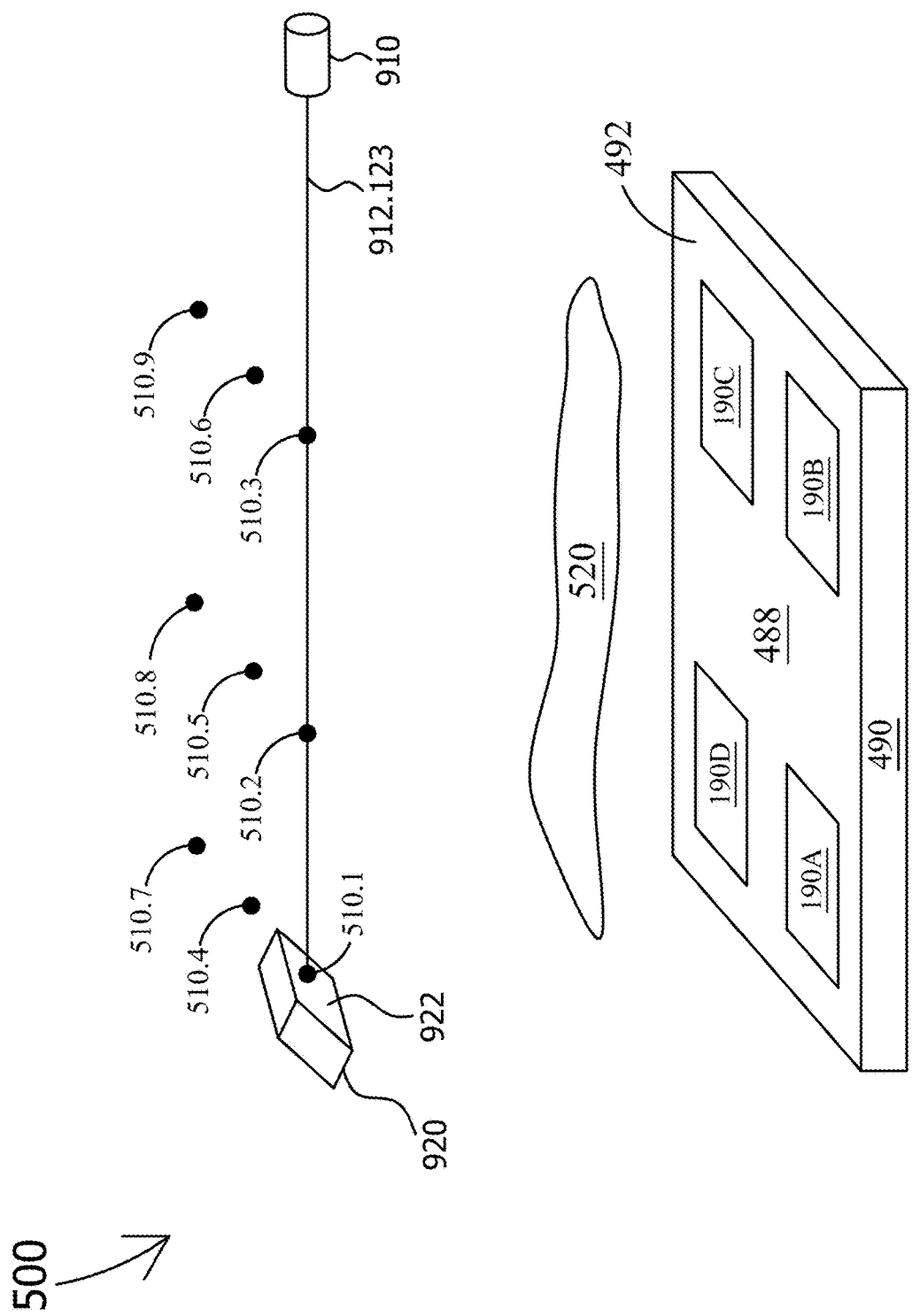

FIG. 9B schematically illustrates a second method of operating the radiation source system 910+920 of FIG. 9A during the exposure process. In an embodiment, the second method of operating the radiation source system 910+920 may be similar to the first method of operating the radiation source system 910+920 except that in the second method, the electron gun 910 and the 3 radiation positions 510.1, 510.2, and 510.3 are arranged such that the electron gun 910 may be configured to shoot an electron beam along a path 912.123 through all 3 radiation positions 510.1, 510.2, and 510.3.

As a result, in the second method, during the first, second, and third radiation exposures of the exposure process, the electron beam generated by the electron gun 910 may remain stationary with respect to the image sensor 490 (i.e., remain on the path 912.123) as the target block 920 moves through the 3 radiation positions 510.1, 510.2, and 510.3 in sequence.

In contrast, in the first method as described above with reference to FIG. 9A, during the first, second, and third radiation exposures of the exposure process, the electron beam generated by the electron gun 910 has to be steered to the 3 radiation positions 510.1, 510.2, and 510.3 in sequence as the target block 920 moves through the 3 radiation positions 510.1, 510.2, and 510.3 respectively in sequence so as to receive the electron beam.

In an embodiment, the second method may be similar to the first method regarding the fourth, fifth, sixth, seventh, eighth, and ninth radiation exposures of the exposure process. Specifically, in both the first and second methods, the electron beam generated by the electron gun 910 is steered to the 6 radiation positions 510.4-9 in sequence as the target block 920 moves through the 6 radiation positions 510.4-9 respectively in sequence so as to receive the electron beam. In an embodiment, the path 912.123 may be a straight line.

In an embodiment, with reference to FIGS. 8A, 9A, and 9B, each of the radiation source system 810+820 and the radiation source system 910+920 may further include a glass vacuum tube (not shown) in which the electron gun 810/910 and the electron bombardment target 820/920 reside and/or move. As a result, the electrons generated by the electron gun 810/910 may travel freely through vacuum to the radiation positions 510.1-9 on the electron bombardment target 820/920 without any interaction with air molecules which might otherwise scatter and/or decelerate the generated electrons.

In an embodiment, with reference to FIGS. 8A, 9A, and 9B, each of the radiation source system 810+820 and the radiation source system 910+920 may further include a DC (direct current) voltage source (not shown) whose cathode is electrically connected to the electron gun 810/910 and whose anode is electrically connected to the electron bombardment target 820/920. As a result, an electric field is created between the electron gun 810/910 and the electron bombardment target 820/920. This electric field helps further accelerate the bombarding electrons generated by the electron gun 810/910.

In some embodiments described above with reference to FIGS. 8A, 8B, 9A, and 9B, there are 9 radiation positions arranged in an array of 3×3 and in the plane 512 (FIG. 5). In general, there may be any number of radiation positions arranged in any way in space (i.e., arranged not necessarily in the form of an array and not necessarily in a plane).

In some embodiments described above with reference to FIG. 9A, the radiation source system has one target block 920 that moves through the 9 radiation positions 510.1-9 in sequence during the exposure process. In an alternative embodiment, the radiation source system may have 9 target blocks similar to the target block 920. These 9 target blocks may be arranged at the 9 radiation positions 510.1-9. As a result, during the exposure process, there is no need to move any one of the 9 target blocks.

In some embodiments described above with reference to FIG. 9B, in the second method of operating the radiation source system 910+920, the electron gun 910 and the 3 radiation positions 510.1, 510.2, and 510.3 are arranged such that the electron gun 910 may be configured to shoot an electron beam along the path 912.123 through all 3 radiation positions 510.1, 510.2, and 510.3. In general, the electron gun 910 and P radiation positions (of the 9 radiation positions) may be arranged such that the electron gun 910 may be configured to shoot an electron beam through all the P radiation positions (P is an integer greater than 1 but not exceeding 9).

As a result, in the second method of operating the radiation source system 910+920, during the P radiation exposures of the exposure process corresponding to the P radiation positions, the electron beam generated by the electron gun 910 may remain stationary with respect to the image sensor 490 as the target block 920 moves through the P radiation positions in sequence.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An imaging system, comprising:
   an image sensor which comprises (a) a top surface, (b) M active areas on the top surface, M being an integer greater than 0, and (c) a dead zone on the top surface and between the M active areas such that no one active area of the M active areas is in direct physical contact with another active area of the M active areas; and
   a radiation source system, which comprises an electron gun and an electron bombardment target,
   wherein, for i=1, ..., N, N being an integer greater than 1, the radiation source system is configured to cause emission of X-ray photons (i) from a radiation position (i) by causing electrons from the electron gun to bombard a target surface of the electron bombardment target at the radiation position (i),
   wherein for i=1, ..., N, in response to the emission of the X-ray photons (i) from the radiation position (i), the image sensor is configured to capture M images (i) of portions (i) of a same object, respectively in the M active areas, resulting in M×N images, and
   wherein each point of the object is captured in at least one image of the M×N images.

2. The imaging system of claim 1, wherein the electron bombardment target has a shape of a plate.

3. The imaging system of claim 1, wherein the electron bombardment target is configured to rotate while the radiation positions (i), i=1, ..., N remain on target surfaces of the electron bombardment target.

4. The imaging system of claim 1, wherein the electron bombardment target is configured to tilt, translate, or both tilt and translate.

5. The imaging system of claim 1, wherein the radiation source system is configured to deflect an electron beam from the electron gun.

6. The imaging system of claim 1,
   wherein the electron bombardment target comprises N target blocks, and
   wherein for i=1, ..., N, the radiation position (i) is on a target surface of a target block (i) of the N target blocks.

7. The imaging system of claim 1, wherein the electron bombardment target comprises tungsten.

8. The imaging system of claim 1, wherein the electron gun is configured to generate an electron beam and then deflect the electron beam.

9. The imaging system of claim 1, further comprising a vacuum tube in which the radiation source system resides.

10. The imaging system of claim 1, further comprising a direct current (DC) voltage source configured to cause a voltage drop from the electron bombardment target to the electron gun.

11. The imaging system of claim 1, wherein M is 1 and N is 2.

12. The imaging system of claim 1, wherein the radiation positions (i), i=1, ..., N are on a plane parallel to the top surface.

13. A method of operating an imaging system which comprises (A) an image sensor comprising (a) a top surface, (b) M active areas on the top surface, M being an integer greater than 0, and (c) a dead zone on the top surface and between the M active areas such that no one active area of the M active areas is in direct physical contact with another active area of the M active areas, and (B) a radiation source system which comprises an electron bombardment target, the method comprising:
   for i=1, ..., N, N being an integer greater than 1, sequentially causing emission of X-ray photons (i) from a radiation position (i) by causing electrons to bombard a target surface of the electron bombardment target at the radiation position (i); and
   for i=1, ..., N, in response to the emission of the X-ray photons (i) from the radiation position (i), capturing M images (i) of portions (i) of a same object, respectively in the M active areas, resulting in M×N images,
   wherein each point of the object is captured in at least one image of the M×N images.

14. The method of claim 13, wherein said causing emission of the X-ray photons (i) from the radiation position (i) comprises holding the electron bombardment target stationary with respect to the image sensor such that the radiation positions (i), i=1, ..., N are on the target surfaces of the electron bombardment target.

15. The method of claim 13, wherein the electron bombardment target has a shape of a plate.

16. The method of claim 14,
   wherein the electron bombardment target comprises N target blocks, and
   wherein for i=1, ..., N, the radiation position (i) is on a target surface of a target block (i) of the N target blocks.

17. The method of claim 13, wherein said causing emission of the X-ray photons (i) from the radiation position (i) comprises rotating the electron bombardment target.

18. The method of claim 13, wherein the electron bombardment target has a shape of a plate.

19. The method of claim 13, wherein said causing emission of the X-ray photons (i) from the radiation position (i) comprises tilting, translating, or both tilting and translating the electron bombardment target.

20. The method of claim 13,
   wherein the radiation source system further comprises an electron gun configured to generate an electron beam, and
   wherein said causing emission of the X-ray photons (i) from the radiation position (i) comprises deflecting the electron beam.

21. The method of claim 20,
   wherein the electron gun and P radiation positions of the radiation positions (i), i=1, ..., N are on a straight line, and
   wherein P is an integer greater than 1 and not greater than N.

22. The method of claim 13, further comprising stitching the M×N images to form an image of the object.

* * * * *